ABRASIVE CUTTING DEVICES

Original Filed April 20, 1959 3 Sheets-Sheet 1

INVENTOR.
FRANK L. CHRISTENSEN
BY
Bernard Kriegel
ATTORNEY.

ABRASIVE CUTTING DEVICES

Original Filed April 20, 1959 3 Sheets-Sheet 2

INVENTOR.
FRANK L. CHRISTENSEN
BY
Bernard Kriegel
ATTORNEY.

INVENTOR.
FRANK L. CHRISTENSEN
BY
Bernard Kriegel
ATTORNEY.

United States Patent Office

Re. 25,434
Reissued Aug. 13, 1963

25,434

ABRASIVE CUTTING DEVICES

Frank L. Christensen, Salt Lake City, Utah, assignor to Christensen Diamond Products Company, Salt Lake City, Utah, a corporation of Utah Original No. 3,049,843, dated Aug. 21, 1962, Ser. No. 807,669, Apr. 20, 1959. Application for reissue Oct. 8, 1962, Ser. No. 230,789
29 Claims. (Cl. 51—206)

Matter enclosed in heavy brackets [ ] appears in the original patent but forms no part of this reissue specification; matter printed in italics indicates the additions made by reissue.

The present invention relates to cutting devices, and more particularly to devices for cutting concrete, marble, tile, brick, slate, granite, onyx, and other like materials.

An object of the invention is to provide cutting devices embodying abrasive cutting elements, such as diamonds embedded in a suitable matrix, which are bonded to a suitable support, the bonding surface being substantially greater than heretofore available. By way of example, segments composed of a matrix in which diamonds are embedded can be brazed or otherwise bonded to the peripheral region of the main supporting disc of a saw over a comparatively large bonding surface, insuring the retention of the segments on the disc under heavy and continuous working conditions.

Another object of the invention is to provide cutting devices embodying diamonds and like abrasive cutting elements embedded in a matrix, in which a lesser quantity of diamonds is used without decreasing the cutting rate of the devices.

A further object of the invention is to provide cutting devices embodying diamonds and like abrasive cutting elements embedded in a matrix, in which a lesser quantity of diamonds is used without decreasing the extent of cutting that can be performed with the devices.

An additional object of the invention is to provide cutting devices embodying diamonds and like abrasive cutting elements embedded in a matrix, in which the devices are capable of performing their cutting action at a faster rate.

Yet another object of the invention is to provide cutting devices embodying diamonds and like abrasive cutting elements embedded in a matrix, the devices cutting a particular configuration in the work being operated upon which will stabilize the devices and resist their deflection, preventing the cracking or breaking of their components, particularly when the devices and their diamond embedded or impregnated matrices are of thin sections, such as occurs in diamond saws and thin wall concrete cutting bits.

Still a further object of the invention is to provide cutting devices embodying diamonds and like abrasive cutting elements embedded in a matrix, the diamond embedded matrices being reinforced, thereby producing devices that are of strong and sturdy construction and better able to withstand severe loads.

This invention possesses many other advantages, and has other objects which may be made more clearly apparent from a consideration of several forms in which it may be embodied. Such forms are shown in the drawings accompanying and forming part of the present specification. These forms will now be described in detail, for the purpose of illustrating the general principles of the invention; but it is to be understood that such detailed description is not to be taken in a limiting sense, since the scope of the invention is best defined by the appended claims.

Referring to the drawings.

Figure 1:
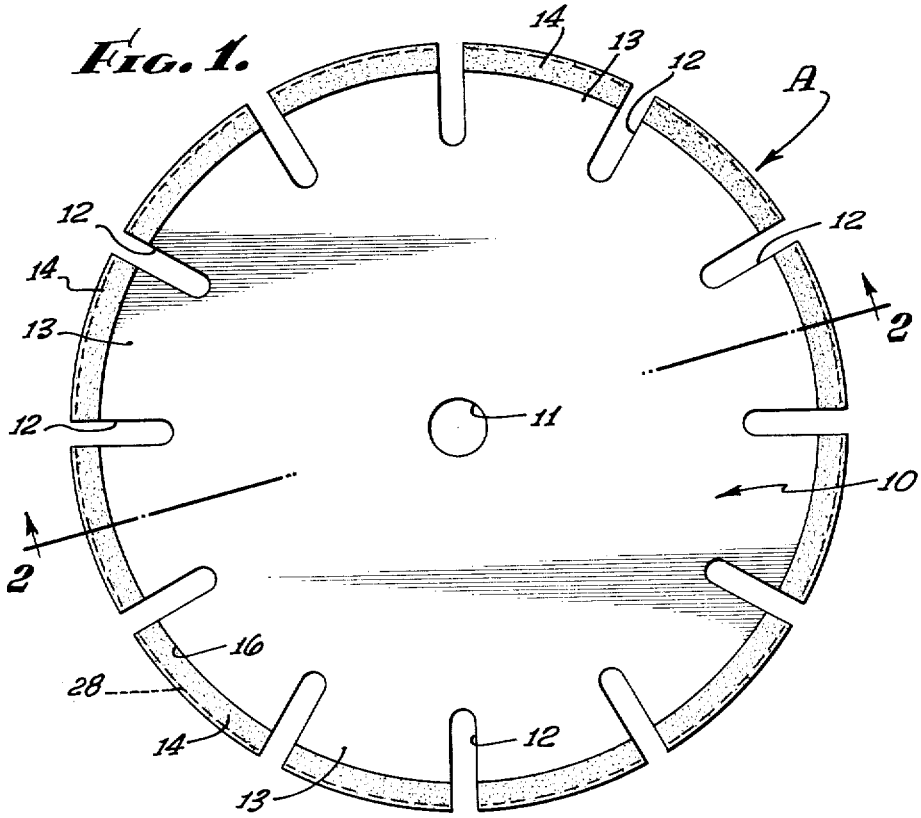
FIGURE 1 is a plan view of a diamond cutting wheel or saw.
Figure 2:
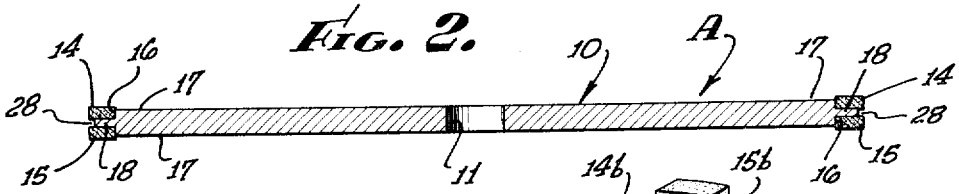
FIG. 2 is a section taken along the line 2—2 on FIG. 1.
Figure 3:
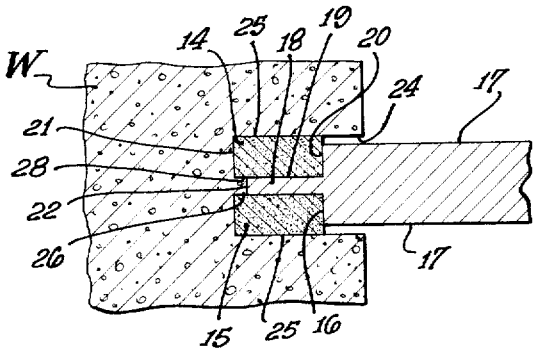
FIG. 3 is an enlarged section disclosing a portion of the diamond cutting saw or wheel operating in concrete or other work.

In the form of invention illustrated in FIGS. 1, 2 and 3, a cutting wheel or saw A is provided that operates effectively in cutting abrasive, coarse aggregates, such as concrete and brick. This wheel includes a main central support or disc 10, that may be made of steel or other suitable material, having a central arbor hole 11 for mounting the wheel on a suitable rotating mechanism (not shown). The disc or support has a plurality of radial slots 12 extending inwardly from its periphery to provide lands 13 on which cutting segments 14, 15 are mounted. As disclosed, two rows of segments are disposed around the peripheral portion of the disc, one row of segments 14 being on one side of the disc and the other row of segments 15 being disposed on the other side of the disc. Each segment is composed of a metallic matrix, such as tungsten or tungsten carbide of a suitable mesh, impregnated with diamonds of a suitable mesh. These segments are attached to the central support or disc by a brazing operation, such as by silver soldering.

It is to be noted that each row of segments is disposed in an arcuate recess 16 extending along each land. In fact, each row of segments may be considered as being disposed in a circumferential recess 16 provided at the peripheral portion of the wheel or disc, each recess extending inwardly to a substantial extent from a side face 17 of the disc toward a central plane of the disc, leaving a central reinforcing, supporting, or stabilizing rib 18 between the recesses which runs around the entire circumference of the wheel or disc except where interrupted by the radial slots 12.

Each segment 14 or 15 is disposed on a land 13 and in a recess 16, the inner surface of the segment engaging the side 19 of the rib 18 which defines the inner side of the recess, and the arcuate inner surface of the segment engaging the bottom 20 of the recess from which the rib 18 extends. Each cutting segment 14, 15 preferably extends laterally outwardly beyond the side 17 of the central supporting member or disc 10 so as to insure the cutting of adequate clearance for the disc during the cutting operation in the particular work W. The outer surface or periphery 21 of the rows of cutting segments 14, 15 have substantially the same radius from the axis of the disc 10 and may extend radially outwardly beyond the periphery 22 of the central supporting rib 18, or at least will extend radially outwardly as far as the periphery 22 of the central supporting rib 18.

Each segement 14, 15 is brazed to the central support or wheel along the sides 19 of the recess 16 in which it is mounted and also along the bottom 20 of the recess, which provides a very large surface or area for bonding each segment to the wheel. As a result, a much stronger bond is provided than was heretofore available, insuring against the breaking off or dislodgment of a segment from the wheel A, even under hard usage of the cutting device.

In the use of the cutting device or saw A illustrated in FIGS. 1, 2 and 3, it is rotated at the proper speed and a suitable supply of a cooling liquid is directed against the saw where it engages the work W. Assuming the saw is to be used for cutting concrete, such as disclosed in FIG. 3, is is brought to bear against the outer surface of the concrete W and will cut a groove 24 therein, as illustrated. The outer sides 25 of the segments 14, 15 will cut the sides of the groove 24 in the concrete while the wheel is moved into and along the latter, whereas the peripheral ends 21 of the segments will cut the bottom of the groove in the concrete. The lateral inward pressure exerted by the sides of the concrete groove upon the segments 14, 15 is transmitted through the segments to the central stabilizing or reinforcing rib 18, which will resist deflection of the segments (which are made of a comparatively brittle material). As a result, the segments will not crack or break. Moreover, it is to be noted that the inner sides of the segments are spaced from one another because of the intervening rib 18, and as a result the bottom of the groove 24 formed in the concrete will have a central rib 26 extending outwardly therefrom and projecting between the rows of segments 14, 15 on opposite sides of the rib 18. This rib 26 will serve to stabilize the disc 10, resisting its lateral deflection. However, since the concrete or other work being severed is of a frangible material, the rib 26 formed therein will not interfere with the cutting effectiveness of the saw in the work since pieces thereof will readily break off. The rib 26 will be formed when the periphery 22 of the reinforcing rib 18 of the wheel is disposed initially inwardly of the peripheries 21 of the diamond abrasive segments 14, 15, and also when the periphery 22 of the reinforcing rib is first substantially flush with the peripheries of the rows 14, 15 of diamond abrasive segments. Since the central support or disc 10 is made of steel, the initial bearing of the periphery of the saw against the work will cause the latter to erode the comparatively soft steel without affecting the diamond abrasive segments 14, 15. As a result, the work itself will provide the circumferential groove 28 between the rows of segments 14, 15 illustrated in the drawings, resulting in the subsequent formation of the stabilizing rib 26 in the work. In fact, since the central rib 18 will wear away more readily than the diamond abrasive segments 14, 15, the wearing away of the latter at their peripheral portions will be accompanied by a wearing away of the rib 18 itself, so that the circumferential groove 28 will always be present between the rows of segments 14, 15.

For the same width of groove 24 that can be cut in the work W, it is found that applicant's arrangement provides a faster cutting rate in the work, inasmuch as the presence of the intervening reinforcing rib 18 and the groove 28 outwardly thereof between the segments 14, 15 places a lesser area in contact with the work. As a result, a greater unit pressure is imposed on the diamond abrasive segments 14, 15 and a faster cutting action is achieved on the concrete or other work.

The lesser end or peripheral area 21 provided by the two separated rows of segments 14, 15, as distinguished from an uninterrupted surface that would be provided in the absence of the reinforcing rib 18 and when single segments extend across the entire thickness of the cutting wheel 10, results in the use of substantially fewer diamonds in the entire cutting saw without diminishing the extent of cutting of the saw. As stated above, the central rib 26 formed in the work does ont impede the progress of the cutting device since such rib, being constituted of frangible material, breaks off readily. Moreover, despite the use of the lesser diamonds, the cutting rate of the device is not diminished at all. In other words, the device will actually cut faster than devices having cutting elements extending across the full width of the groove 24 being cut in the work W.

The cutting device illustrated in FIGS. 1, 2 and 3 is comparatively simple in construction, easy to manufacture, and comparatively economical to make. It operates very effectively in abrasive, coarse aggregates, such as concrete and brick.

Figure 4:
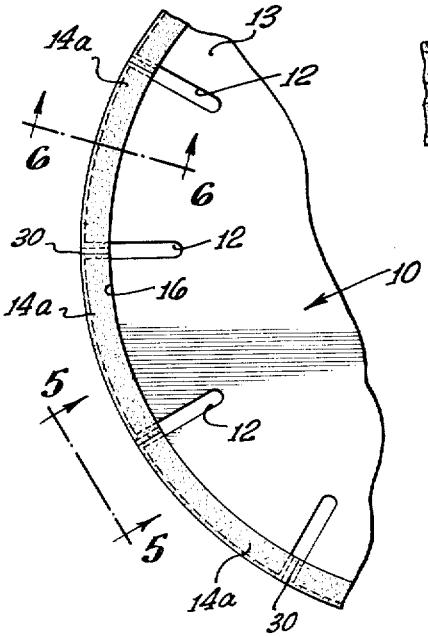
FIG. 4 is a view similar to FIG. 1 of a portion of another embodiment of the invention.
Figure 5:
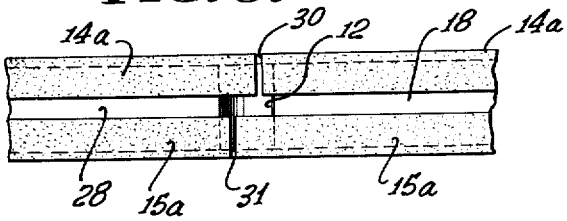
FIG. 5 is a view on an enlarged scale taken along the line 5—5 on FIG. 4.
Figure 6:
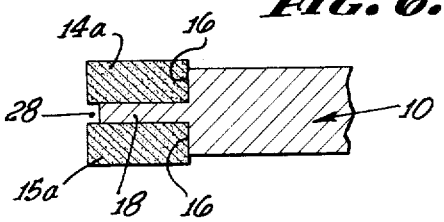
FIG. 6 is a section on an enlarged scale taken along the line 6—6 on FIG. 4.

The form of the invention disclosed in FIGS. 4, 5 and 6 is substantially the same as in FIGS. 1, 2 and 3 except that there are no gaps or spaces provided through the entire thickness of the cutting device at the slots 12. Two rows of segments 14a, 15a are provided in the opposed circumferential recesses 16 on the main central support or disc 10. However, the segments in each row are closely adjacent one another, there being a slight air gap 30 or 31 therebetween which will prevent the segments in each row from becoming attached to each other during the brazing operation, which, upon cooling, might produce cracks in the segments. The segments 14a of one row are offset slightly with respect to the segments 15a in the other row, being disposed in stepped fashion with respect to one another (see FIG. 5). Accordingly, the two rows of segments 14a, 15a form a circumferentially continuous cutting surface around the periphery of the saw or wheel, there always being a peripheral portion of a segment in contact with the work.

The stepped segment arrangement illustrated in FIGS. 4, 5 and 6 results in a cutting device that operates more effectively in certain types of work. This arrangement performs very effectively in fine, dense aggregates, such as marble, glazed tile, slate, granite, and onyx. Cuts in such materials are performed in better fashion with cutting saws having an uninterrupted periphery, which is provided in the present case by virtue of stepping the segments 14a in one row with respect to the segments 15a in the other row. Such stepped arrangement and the slight gaps 30, 31 between the segments in each row also facilitates the washing out of the cut particles from the gaps. The washing liquid flows from both sides of the wheel 10 through the gaps 30, 31 into the peripheral groove 28, and then outwardly of the periphery of the cutting wheel 10.

Figure 7:
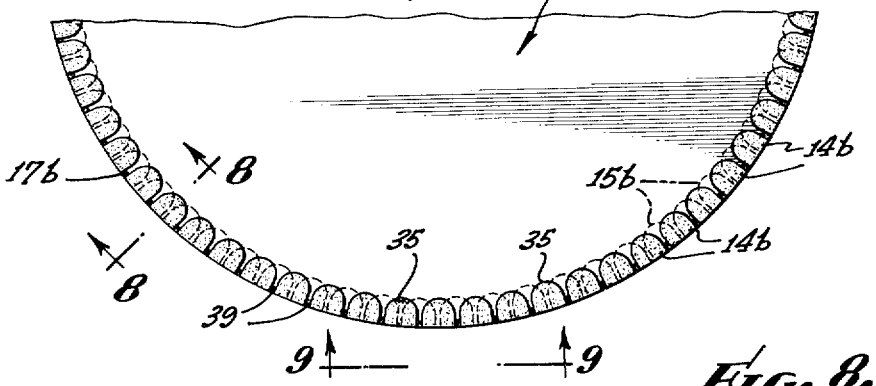
FIG. 7 is a view corresponding to FIG. 1 of a portion of still another embodiment of the invention.
Figure 9:
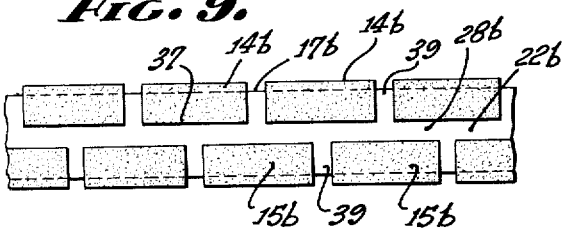
FIG. 9 is an enlarged end view taken along the line 9—9 on FIG. 7.
Figure 8:
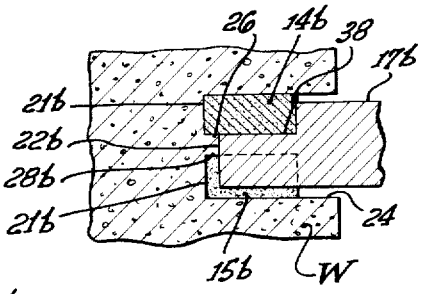
FIG. 8 is a section through a fragment of the diamond cutting wheel or saw disclosed in FIG. 7 in the act of cutting a piece of work, the section through the fragment being on an enlarged scale and taken generally along the line 8—8 of FIG. 7.

In the form of invention disclosed in FIGS. 7, 8 and 9, the radial slots 12 in the central support or disc 10b are omitted. However, two rows of segments 14b, 15b are still provided that are separated from one another, the intervening periphery 22b of the steel support being of a lesser radial extent than the peripheries 21b of the rows of segments. Here again, if the intervening steel support has the same radius as the rows of segments, the work W in which the cutting operation is being performed will erode such central portion of the support and produce the peripheral groove 28b between the spaced rows of segments.

Figure 16:
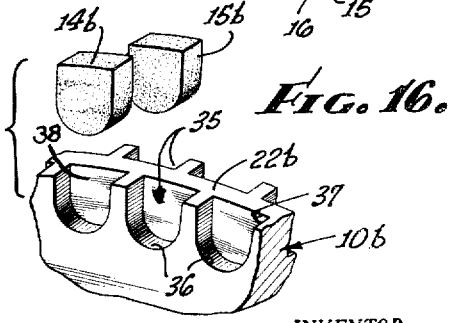
FIG. 16 is an exploded isometric projection of a portion of the diamond cutting wheel disclosed in FIGS. 7, 8 and 9.

As disclosed in FIGS. 7, 8 and 9, each segment in each row is of comparatively short arcuate extent and is disposed in a recess or socket 35 extending inwardly from the periphery 22b of the central support or wheel 10b. Each socket opens outwardly of the periphery of the wheel and is of uniform thickness from the periphery of the disc to the innermost portion 36 of the socket (FIG. 16). Each diamond abrasive segment 14b, 15b has a shape conforming to the shape of the socket 35, but a thickness greater than the depth 37 of the socket so that the segment projects outwardly beyond the side face 17b of the wheel. Moreover, each segment also preferably extends outwardly beyond the periphery 22b of the wheel, as disclosed most clearly in FIGS. 7 and 8 of the drawings.

Each segment 14b, 15b is brazed to the wheel over a comparatively large combined surface, which surface is the bottom 38 of the recess, and the sides of the recess extending substantially axially of the wheel from the bottom 38 to the outer side 17b.

The segments of each row are separated by a slight gap 39 from one another, and the segments of one row 14b are staggered with respect to the segments 15b of another row, such that the segments of one row overlap the gaps 39 in the segments of the other row. As a practical matter, a substantially uninterrupted periphery is provided, in that there will always be a segment in contact with the work, as distinguished from the intermittent arrangement illustrated in FIGS. 1, 2 and 3. The rows of segments 14b, 15b are separated axially from one another to provide the groove 28b therebetween, which will also form the rib 26 in the work that will effect a stabilizing of the entire cutting device, its lateral deflection being minimized. In addition, it is found that the staggering of the rows of segments with respect to one another substantially reduces lateral vibration in the entire saw blade or cutting device. The spaces 39 between the segments on each face of the saw provide regions through which the flushing and cooling water can flow readily. The water will flow through the spaces on each face, through the end gaps 39, to the peripheral groove 28b between the rows of segments. This arrangement provides for continuous fluid communication from the opposed side faces of the saw blade structure to the intermediate peripheral groove.

The short arcuate segments 14b, 15b in each row provide an intermittent cutting action on the material and an intermittent freeing action on the cut material, which facilitates its washing from the cutting regions. As a result, the cut material does not pack between the segments and the uncut material, which may occur when long arcuate segments are used.

The cutting device illustrated in FIGS. 7, 8 and 9 is found to operate effectively in fine, dense aggregates.

Figure 10:
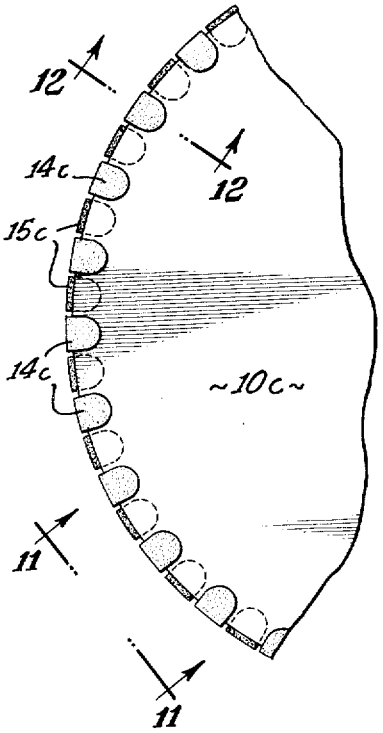
FIG. 10 is a view similar to FIG. 1 of a portion of still another form of the invention.
Figure 11:
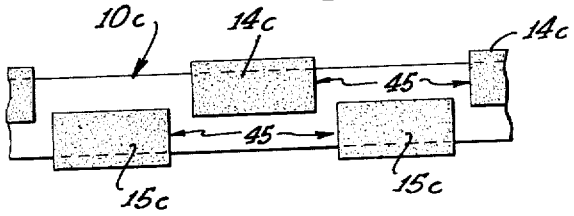
FIG. 11 is an enlarged end view taken along the line 11—11 on FIG. 10.
Figure 12:
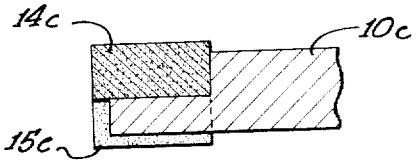
FIG. 12 is an enlarged section taken along the line 12—12 on FIG. 10.

The form of invention disclosed in FIGS. 10, 11 and 12 is essentially the same as in the form illustrated in FIGS. 7, 8 and 9, except that the rows of segments 14c, 15c on opposite sides of the main support or wheel 10c are not axially separated. Instead, they overlap one another, as shown most clearly in FIG. 11. This arrangement enables thicker diamond abrasive segments or inserts 14c, 15c to be used. In addition, the segments of each row are spaced from one another to a much greater extent than in the form of invention shown in FIGS. 7, 8 and 9, inasmuch as the segments of each row axially overlap the segments of the other row. Accordingly, much greater water passage spaces or areas 45 are present for the cleaning and cooling water to flow from each side of the cutting wheel, through the spaces 45 between the segments of each row, and thence outwardly of the periphery of the wheel.

It is found that the cutting wheel illustrated in FIGS. 10, 11 and 12 is very effective in cutting coarse abrasive materials.

Figure 14:
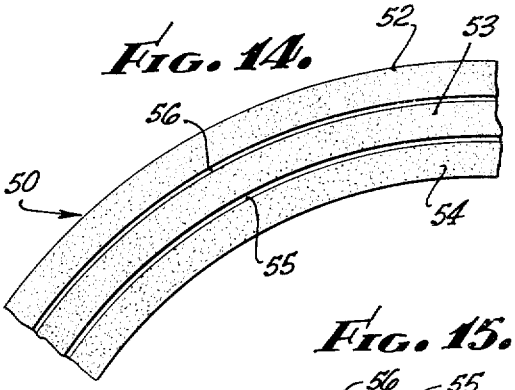
FIG. 14 is an enlarged view of a fragment of the end face of the bit shown in FIG. 13.
Figure 13:
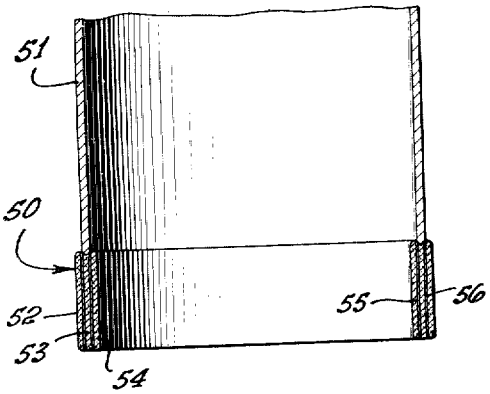
FIG. 13 is a longitudinal section through a cylindrical cutting device or bit, constituting yet another form of the invention.
Figure 15:
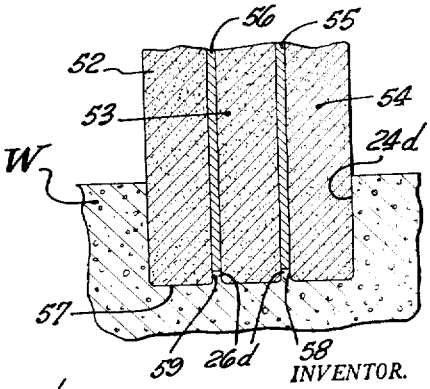
FIG. 15 is an enlarged longitudinal section showing the bit crown of FIG. 13 operating in concrete or other work.

The form of invention shown in FIGS. 13, 14 and 15 can be used for cutting cores, and the like, from concrete and other materials W. It consists of an annular bit crown 50, the upper end of which is suitably secured, as by brazing, to a rotatable cylindrical support or shank 51. The bit crown consists of a plurality of rings 52, 53, 54 of diamond abrasive material, such as diamonds impregnated in a matrix of tungsten, tungsten carbide, or the like. As specifically disclosed, an inner diamond impregnated matrix ring 54, an intermediate matrix ring 53, and an outer matrix ring 52 are provided, the inner and intermediate rings 54, 53 being separated by a reinforcing ring 55 of steel or similar material, whereas the intermediate abrasive ring 53 and the outer abrasive ring 52 are separated by an outer reinforcing ring 56 of steel or corresponding material. The abrasive rings 52, 53, 54 preferably have diamonds embedded therein throughout their length, and the lower end faces 57 of the rings 52, 53, 54 may all lie in the same plane normal to the axis of the bit crown 50 and the shank 51. The steel reinforcing rings 55, 56 may also extend along substantially the entire length of the bit crown and may also extend to the plane just referred to, or they may terminate slightly above such plane so as to provide circumferential grooves 58, 59 between the inner, intermediate and outer abrasive rings 54, 53, 52.

In the operation of the cutting device illustrated in FIGS. 13, 14 and 15 upon concrete W, or similar material, the bit crown will form a circumferential groove 24d in the concrete, the diamonds cutting away the material, which is removed from the cutting region by the use of a suitable flushing fluid, such as water. During the cutting action, circumferential ribs 26d of concrete will be formed in the bottom of the concrete groove which will project upwardly between the inner, intermediate, and outer diamond impregnated rings 54, 53, 52. The bit crown 50 is ordinarily comparatively thin, so that such ribs 26d will resist their lateral deflection, preventing their cracking and breaking, much in the same manner as the ribs 26 formed with the diamond saws and wheels resisting lateral deflection of the diamond abrasive segments or inserts. If the reinforcing rings 55, 56 initially extended downwardly to the lower end 57 of the bit crown, the concrete or other work being produced erodes such rings away to provide the circumferential end grooves 58, 59 between the diamond abrasive rings.

The circumferential ribs 26d produced in the bottom of the concrete groove will not impede progress of the bit through the work W since such ribs, being of frangible material, will readily break away and will be carried from the cutting regions by the flushing liquid. However, rib portions 26d will continuously be formed during the cutting action since the grooves 58, 59 between the diamond abrasive rings will always be present, despite the fact that the diamond rings 52, 53, 54 will also wear away axially. The reinforcing rings 55, 56 therebetween erode or wear away more readily than the diamond impregnated rings.

As is true with the rotating wheels, the bit crown 50 can cover the required cutting area of the work with a lesser number of diamonds or stones. In addition, the effective end area of the crown engaging the work is reduced by the area of the intervening steel or reinforcing ribs 55, 56, resulting in a greater unit pressure being imposed on the work, thereby increasing the rate of cutting of the bit. The diamonds are preferably uniformly dispersed throughout the entire length of the matrix rings 52, 53, 54. Because of such uniform distribution, the load is also distributed uniformly around the entire circumference of the bit face 57 as the bit wears away. Since the diamonds are uniformly disposed throughout the entire length of the matrix, they become substantially uniformly exposed as the matrix wears away.

The inventor claims:

1. In an abrasive cutting device: a one piece *preformed metallic* supporting member having an outer end portion adapted to engage the work being cut; and preformed abrasive members *substantially harder than said supporting member* brazed to opposite parallel sides of said outer end portion and to said supporting member inwardly of said outer end portion, said abrasive members extending outwardly at least to the outer end of said end portion to engage the work being cut; the abrasive members on one side of said outer end portion being parallel to the abrasive members on the other side of said outer end portion.

2. In an abrasive cutting device: a *preformed metallic* supporting member having an outer end portion adapted to engage the work being cut; and preformed abrasive members *substantially harder than said supporting member* secured to opposite parallel sides of said outer end portion and extending outwardly at least to the outer end of said end portion to engage the work being cut; said abrasive members on one side of said outer end portion being parallel to and spaced laterally from said members on the other side of said outer end portion, whereby a stabilizing rib is formed in the work between said abrasive members.

3. In an abrasive cutting device: a one piece *preformed metallic* supporting member having an outer end portion adapted to engage the work being cut and having parallel side faces; a first set of preformed diamond abrasive segments brazed to one side face of said outer end portion and to said supporting member inwardly of said outer end portion; a second set of preformed diamond abrasive segments brazed to the opposite side face of said outer end portion and to said supporting member inwardly of said outer end portion; said first and second sets being parallel to one another and extending at least to the outer end of said end portion to engage the work being cut.

4. In an abrasive cutting device: a *preformed metallic* supporting member having an outer end portion adapted to engage the work being cut and having parallel side faces; a first set of preformed diamond abrasive segments secured to one side face of said outer end portion; a second set of preformed diamond abrasive segments secured to the opposite side face of said outer end portion; said first and second sets extending at least to the outer end of said end portion to engage the work being cut; said first set of segments being parallel to one another and spaced laterally from said second set of segments, whereby a rib is formed in the work between said sets of segments.

5. In an abrasive cutting device: a one piece *preformed metallic* supporting member having recesses in opposite parallel sides of its outer end portion; preformed diamond abrasive members in said recesses and bonded to all of the walls of said recesses; said diamond abrasive members in said recesses on opposite sides of said supporting member being parallel to one another and extending outwardly at least to the outer end of said supporting member, whereby the outer ends of said diamond abrasive members act simultaneously upon the work being cut.

6. In an abrasive cutting *saw* device: a one piece *preformed metallic* supporting disc having recesses in its opposite parallel sides at its peripheral portion; preformed diamond abrasive members in said recesses bonded to all of the walls of said recesses and extending radially of said disc at least to its periphery; the members on one side of said disc being parallel to the members on the opposite side of said disc.

7. In an abrasive cutting *saw* device: a *preformed metallic* supporting disc having recesses in its opposite parallel sides at its peripheral portion; preformed diamond abrasive members in said recesses bonded to the walls of said recesses and extending radially of said disc at least to its periphery, the members on one side of said disc being parallel to the members on the opposite side of said disc, said abrasive members on opposite sides of said disc being axially spaced from each other.

8. In an abrasive cutting *saw* device: a one piece *preformed metallic* supporting [member] *disc* having recesses in opposite parallel sides of its outer end portion; a first set of circumferentially spaced preformed diamond abrasive segments in the recesses on one side of said disc; a second set of circumferentially spaced preformed diamond abrasive segments in the recesses on the opposite side of said disc; said segments being bonded to all the walls of said recesses and extending radially outwardly at least to the periphery of said disc; the segments on one side of said [member] *disc* being parallel to the segments on the opposite side of said [member] *disc.*

9. In an abrasive cutting *saw* device: a *preformed metallic* supporting [member] *disc* having recesses in opposite parallel sides of its outer end portion; a first set of circumferentially spaced preformed diamond abrasive segments in the recesses on one side of said disc; a second set of circumferentially spaced preformed diamond abrasive segments in the recesses on the opposite side of said disc; said segments being bonded to the walls of said recesses and extending radially outwardly at least to the periphery of said disc; the segments on one side of said [member] *disc* being parallel to the segments on the opposite side of said [member] *disc;* said first set of segments being axially spaced from said second set of segments.

10. In an abrasive cutting *saw* device: a one piece *preformed metallic* supporting [member] *disc* having recesses in parallel opposite sides of its outer end portion; a first set of circumferentially spaced preformed diamond abrasive segments in the recesses on one side of said disc; a second set of circumferentially spaced preformed diamond abrasive segments in the recesses on the opposite side of said disc; said segments being bonded to all of the walls of said recesses and extending radially outwardly at least to the periphery of said disc; the segments on one side of said [member] *disc* being parallel to the segments on the opposite side of said [member] *disc;* said first set of segments being in staggered relation to said second set of segments.

11. In an abrasive cutting *saw* device: a *preformed metallic* supporting [member] *disc* having recesses in opposite parallel sides of its outer end portion; a first set of circumferentially spaced preformed diamond abrasive segments in the recesses on one side of said disc; a second set of circumferentially spaced preformed diamond abrasive segments in the recesses on the opposite side of said disc; said segments being bonded to the walls of said recesses and extending radially outwardly at least to the periphery of said disc; the segments on one side of said [member] *disc* being parallel to the segments on the opposite side of said [member] *disc;* said first set of segments being axially spaced from said second set of segments; said first set of segments being in staggered relation to said second set of segments.

12. In an abrasive cutting *saw* device: a supporting disc having a radial rib at its peripheral portion *extending substantially 360° around the circumference of said disc and being* substantially thinner than the disc radially inwardly thereof to provide circumferential recesses on opposite sides of said rib; and preformed diamond abrasive members in said recesses bonded to parallel side faces of said rib and to portions of said disc adjacent to said rib; said diamond abrasive members on opposite sides of said rib being axially spaced from each other and extending at least to the periphery of said rib; the members on one side of said rib being parallel to the members on the opposite side of said rib.

13. In an abrasive cutting *saw* device: a supporting disc having a radial rib at its peripheral portion *extending substantially 360° around the circumference of said disc and being* substantially thinner than the disc radially inwardly thereof to provide circumferential recesses on opposite parallel sides of said rib; said disc having circumferentially spaced radial slots at its peripheral portion extending through said rib to provide lands between said slots; a first set of circumferentially spaced performed diamond abrasive segments in the recesses on one side of said disc, each segment of said first set being bonded to the rib portion of each land and to the land adjacent to such rib portion; a second set of circumferentially spaced preformed diamond abrasive segments in the recesses on the opposite side of said disc, each segment of said second set being bonded to the rib portion of each land and to the land adjacent to such rib portion; said first set of segments being axially spaced from said second set of segments and both sets of segments extending at least to the periphery of said rib; the segments on one side of said rib being parallel to the segments on the opposite side of said rib.

14. In an abrasive cutting *saw* device: a supporting disc having a radial rib at its peripheral portion *extending substantially 360° around the circumference of said disc and being* substantially thinner than the disc radially inwardly thereof to provide circumferential recesses on opposite parallel sides of said rib; said disc having circumferentially spaced radial slots at its peripheral portion extending through said rib to provide lands between said slots; a first set of circumferentially spaced preformed diamond abrasive segments in the recesses on one side of said disc, each segment of said first set being bonded to the rib portion of each land and to the land adjacent to such rib portion; a second set of circumferentially spaced preformed diamond abrasive segments in the recesses on the opposite side of said disc, each segment of said second set being bonded to the rib portion of each land and to the land adjacent to such rib portion; said first set of segments being axially spaced from said second set of segments and both sets of segments extending at least to the periphery of said rib; the segments on one side of said rib being parallel to the segments on the opposite side of said rib; each of said segments terminating in a radial slot; said first set of segments being circumferentially offset with respect to said second set of segments, whereby said segments of said first set are in stepped relation at said slots to said segments of said second set.

15. In an abrasive cutting *saw* device: a one piece *preformed metallic* supporting disc having parallel sides and a plurality of circumferentially spaced recesses in one of said sides opening through its periphery and a plurality of circumferentially spaced recesses in the other side thereof opening through its periphery; and preformed abrasive segments in all of said recesses *substantially harder than said supporting disc* bonded to all of the walls of the disc defining said recesses and extending radially outwardly at least to the periphery of said disc; the segments on one side of said disc being parallel to the segments on the other side of said disc.

16. In an abrasive cutting *saw* device: a *preformed metallic* supporting disc having parallel sides and a plurality of circumferentially spaced recesses in one of said sides opening through its periphery and a plurality of circumferentially spaced recesses in the other side thereof opening through its periphery; and preformed abrasive segments in all of said recesses *substantially harder than said supporting disc* bonded to the walls of the disc defining said recesses and extending radially outwardly at least to the periphery of said disc; the segments on one side of said disc being parallel to the segments on the other side of said disc; the segments on one side of said disc being axially spaced from the segments on the other side of said disc.

17. In an abrasive cutting *saw* device: a one piece *preformed metallic* supporting disc having parallel sides and a plurality of circumferentially spaced recesses in one of said sides opening through its periphery and a plurality of circumferentially spaced recesses in the other side thereof opening through its periphery; and preformed abrasive segments in all of said recesses *substantially harder than said supporting disc* bonded to all of the walls of the disc defining said recesses and extending radially outwardly at least to the periphery of said disc; the segments on one side of said disc being parallel to the segments on the other side of said disc; the segments and recesses on one side of said disc being in staggered relation to the segments and recesses on the other side of said disc.

18. In an abrasive cutting *saw* device: a *preformed metallic* supporting disc having parallel sides and a plurality of circumferentially spaced recesses in one of said sides opening through its periphery and a plurality of circumferentially spaced recesses in the other side thereof opening through its periphery; and preformed abrasive segments in all of said recesses *substantially harder than said supporting disc* bonded to the walls of the disc defining said recesses and extending radially outwardly at least to the periphery of said disc; the segments on one side of said disc being parallel to the segments on the other side of said disc; the segments and recesses on one side of said disc being in staggered relation to the segments and recesses on the other side of said disc; the segments on one side of said disc being axially spaced from the segments on the other side of said disc.

19. In an abrasive cutting *saw* device: a one piece *preformed metallic* supporting disc having parallel sides and a plurality of circumferentially spaced recesses in one of said sides opening through its periphery and a plurality of circumferentially spaced recesses in the other side thereof opening through its periphery; and preformed abrasive segments in all of said recesses *substantially harder than said supporting disc* bonded to all of the walls of the disc defining said recesses and extending radially outwardly at least to the periphery of said disc; the segments on one side of said disc being parallel to the segments on the other side of said disc; the segments and recesses on one side of said disc being in staggered relation to the segments and recesses on the other side of said disc; the segments on one side of said disc axially overlapping the segments on the other side of said disc.

20. In an abrasive cutting *saw* device: a one piece *preformed metallic* supporting [member] *disc* having parallel sides and a plurality of spaced recesses therearound on one of said sides and opening through the end thereof and a plurality of spaced recesses therearound on the other side thereof and opening through the end thereof; and preformed diamond abrasive segments in all of said recesses bonded to all of the walls of the disc defining said recesses and extending outwardly at least to the end of said [member] *disc*; the segments on one side of said disc being parallel to the segments on the other side of said disc.

21. In an abrasive cutting *saw* device: a one piece *preformed metallic* supporting [member] *disc* having parallel sides and a plurality of spaced recesses theraround on one of said sides and opening through the end thereof and a plurality of spaced recesses therearound on the other side thereof and opening through the other end thereof; and preformed diamond abrasive segments in all of said recesses bonded to all of the walls of the disc defining said recesses and extending outwardly at least to the end of said [member] *disc*; the segments on one side of said disc being parallel to the segments on the other side of said disc; the segments and recesses on one side of said [member] *disc* being in staggered relation to the segments and recesses on the other side of said [member] *disc*.

*22. In an abrasive cutting saw device: a preformed metallic supporting member having an outer end portion adapted to engage the work being cut; diamond abrasive members of finite form cohered to opposite parallel sides of said outer end portion and to said supporting portion inwardly of said outer end portion, said abrasive members extending outwardly at least to the outer end of said end portion to engage the work being cut; the abrasive members on one side of said outer end portion being parallel to the abrasive members on the other side of said outer end portion.*

*23. In an abrasive cutting saw device: a preformed metallic supporting member having an outer end portion adapted to engage the work being cut; abrasive members of finite form substantially harder than said supporting member cohered to opposite parallel sides of said outer end portion and extending outwardly at least to the outer end of said end portion to engage the work being cut; said abrasive members on one side of said end portion being parallel to and spaced laterally from said members*

*on the other side of said outer end portion, whereby a stabilizing rib is formed in the work between said abrasive members.*

*24. In an abrasive cutting saw device: a preformed metallic supporting member having an outer end portion adapted to engage the work being cut and having parallel side faces; a first set of diamond abrasive segments of finite form cohered to one side face of said outer end portion; a second set of diamond abrasive segments of finite form cohered to the opposite side face of said outer end portion; said first and second sets extending at least to the outer end of said end portion to engage the work being cut; said first set of segments being parallel to one another and spaced laterally from said second set of segments, whereby a rib is formed in the work between said sets of segments.*

*25. In an abrasive cutting saw device: a preformed metallic supporting member having recesses in opposite parallel sides of its outer end portion; diamond abrasive members of finite form in said recesses and bonded to all of the walls of said recesses; said diamond abrasive members in said recesses on opposite sides of said supporting member being parallel to one another and extending outwardly at least to the outer end of said supporting member, whereby the outer ends of said diamond abrasive members act simultaneously upon the work being cut.*

*26. In an abrasive cutting saw device: a preformed metallic supporting disc having recesses in its opposite parallel sides at its peripheral portion; diamond abrasive members of finite form in said recesses bonded to all of the walls of said recesses and extending radially of said disc at least to its periphery; the members on one side of said disc being parallel to the members on the opposite side of said disc.*

*27. In an abrasive cutting device: a preformed metallic supporting disc having recesses in its opposite parallel sides at its peripheral portion; diamond abrasive members of finite form in said recesses bonded to all of the walls of said recesses and extending radially of said disc at least to its periphery; the outer side surfaces of said members*

*on opposite sides of said disc being parallel to each other.*

*28. In an abrasive cutting device: a preformed metallic supporting disc having recesses in its opposite parallel sides at its peripheral portion; diamond abrasive members of finite form in said recesses bonded to the walls of said recesses and extending radially of said disc at least to its periphery; the members on one side of said disc being parallel to the members on the opposite side of said disc, said abrasive members on opposite sides of said disc being axially spaced from each other.*

*29. In an abrasive cutting device: a preformed metallic supporting disc having a radial rib at its peripheral portion extending substantially 360° around the circumference of said disc and being substantially thinner than the disc radially inwardly thereof to provide circumferential recesses on opposite sides of said rib; diamond abrasive members of finite form in said recesses bonded to parallel side faces of said rib and to portions of said disc adjacent to said rib; said diamond abrasive members on opposite sides of said rib being axially spaced from each other and extending at least to the periphery of said rib; the members on one side of said rib being parallel to the members on the opposite side of said rib.*

References Cited in the file of this patent or the original patent

UNITED STATES PATENTS

| | | |
|---|---|---|
| 869,574 | Huther | Oct. 29, 1907 |
| 2,223,864 | Zublin | Dec. 3, 1940 |
| 2,225,193 | Benner et al. | Dec. 17, 1940 |
| 2,388,020 | Suwa | Oct. 30, 1945 |
| 2,808,044 | Upper et al. | Oct. 1, 1957 |
| 2,857,671 | Nelson | Oct. 28, 1958 |
| 2,978,847 | Shoenmakers | Apr. 11, 1961 |

FOREIGN PATENTS

| | | |
|---|---|---|
| 117,025 | Sweden | Aug. 13, 1946 |
| 542,054 | Great Britain | Dec. 23, 1941 |
| 580,867 | Great Britain | Sept. 23, 1946 |
| 952,884 | Germany | Nov. 22, 1956 |
| 1,147,420 | France | Nov. 25, 1957 |